United States Patent Office 3,533,643
Patented Oct. 13, 1970

3,533,643
BICYCLE FRAME ASSEMBLY
Ryoichi Yamada, Nagoya-shi, Japan, assignor to Sanki Bicycle Co., Ltd., Nagoya-shi, Japan
Filed May 13, 1968, Ser. No. 728,530
Claims priority, application Japan, May 25, 1967, 42/44,320
Int. Cl. B62k 3/02
U.S. Cl. 280—281
5 Claims

ABSTRACT OF THE DISCLOSURE

A bicycle frame assembly consists of a plurality of regular, hexagonal in cross-section tubular members assembled in such a manner that a pair of radially opposed vertices of said member is disposed in the vertical plane of symmetry of said frame assembly.

---

The present invention relates to the improvement of a bicycle frame assembly and more particularly it relates to the improvement of a bicycle frame assembly without a front fork skeleton frame.

It has been discovered that, when the single track vehicle such as a bicycle is used in riding, the main component of the load applied on the bicycle is always included in the plane of symmetry of the bicycle frame assembly, so that the structure of the bicycle frame assembly must preferably have sufficient strength to meet said component of the load applied thereto during use. The conventional bicycle frame assembly, however, has been composed of tubular members each being circular in cross-section and having adequate strength to meet the stress as applied thereto in all directions, with the results that the tubular members used are of necessity heavy in thickness whereby the bicycle frame assembly wastes material and becomes heavy in weight.

The purpose of the present invention is to eliminate above-mentioned shortcomings of the conventional bicycle frame assembly.

A principal object of the present invention is to provide an improved bicycle frame assembly which has adequate strength to resist the main component of the load applied thereto during use and economize in material and is light in weight.

Another object of the present invention is to provide an improved bicycle frame assembly in which a seat tube, a diagonal tube and a top tube are, respectively, made of regular hexagonal tubular members and these regular hexagonal tubular members are assembled in such a manner that any one pair of radially opposed, parallel angle portions of said each regular hexagonal tubular member is vertically disposed or is included in the plane of symmetry of the bicycle frame assembly.

A further object of the present invention is to provide an improved bicycle frame assembly in which accessories such as an air pump, a tool bag, a signboard and the like may be attached thereto positively, easily and reliably.

The above and other objects and features of the present invention will become more apparent from the following description taken in connection with the accompanying drawings in which corresponding reference characters indicate corresponding parts in all figures, it is, however, to be cearly understood that illustrative bicycle frame assembly is selected for description merely by way of exemplification of the invention and not by way of the limitation thereof.

Figure 1:
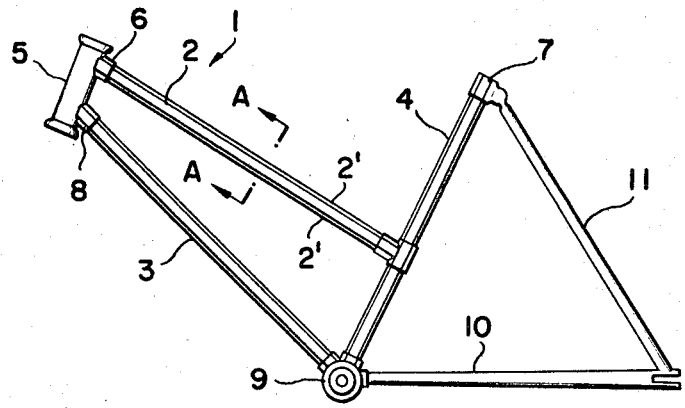
FIG. 1 is a side elevational view illustrating a staggered-type bicycle frame assembly according to the present invention.
Figure 3:
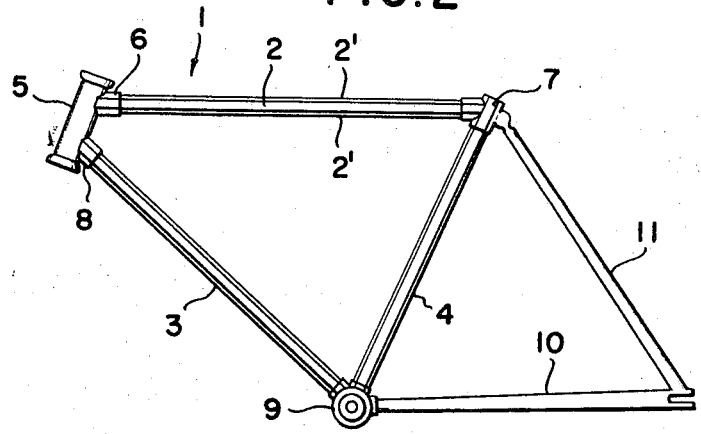
FIG. 3 is a side elevational view of a diamond-type bicycle frame assembly.

Referring to FIG. 1 and FIG. 3 which show a staggered-type bicycle frame assembly and a diamond-type bicycle frame assembly, respectively, the present bicycle frame assembly 1 comprises a top tube 2, a diagonal tube 3 and a seat tube 4 with these tubes being assembled so as to form the staggered-type or the diamond-type bicycle frame assembly. These types of finished bicycle frame assembly just mentioned form no part of the present invention per se, and will accordingly not be described in detail with it being sufficient to say for purposes of description that; the top tube 2 has the foremost end connected to a head post 5 through a top head lug 6 and also has the rearmost end connected to a seat lug 7 (in the diamond-type) or a middle portion of the seat tube 4 (in the staggered-type); the diagonal tube 3 has the foremost end connected to the head post 5 through a bottom head lug 8 and has the rearmost end connected to a bracket lug 9; the seat tube 4 has the upper-most end connected to the seat lug 7 and also has the lowermost end connected to the bracket lug 9.

It will be, furthermore, seen that the reference numeral 10 designates a chain stay, and the reference numeral 11 designates a seat stay.

Figure 2:
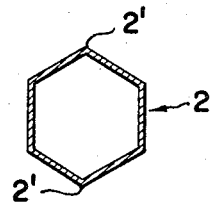
FIG. 2 is a cross-sectional view taken on the line A—A of FIG. 1.

Now, according to the present invention, the top tube 2, the diagonal tube 3 and the seat tube 4 are formed regular hexagonal in contour, respectively. Shown in drawings, more particular in FIG. 2, each of these tubular members are as formed regular hexagonal in contour.

In assembly of these tubular members to form the bicycle frame, the hexagonal tubular members are assembled in such a manner that any one pair of radially opposed vertices 2' and 2' of each regular hexagonal tubular member is vertically disposed or included in the plane of symmetry of the bicycle frame assembly.

With the bicycle frame assembly of the present invention being arranged as described above, the bicycle frame assembly may effectively resist the main component of the load applied thereto during use, because each of the regular hexagonal tubular members has the most strength to resist the load applied thereto along the diagonal plane extending between any pair of radially opposed vertices 2' and 2' of each regular hexagonal tubular member and that the diagonal plane extending between the radially opposed, vertices 2' and 2' is included in the vertical plane of symmetry of the bicycle frame assembly. From the foregoing it will be seen that even if the regular hexagonal tubular members are each reduced considerably in thickness as compared with the circular tubular members commonly employed heretofore, the bicycle frame assembly made from these regular hexagonal tubular members has sufficient strength to resist the main component of the load applied thereto, whereby the present bicycle frame assembly may economize in material and is extremely light in weight.

Furthermore, the regular hexagonal tubular member has flat portions so that accessories such as an air pump, a signboard, a tool bag and the like may be mounted positively, easily and reliably on the flat portions with large contact areas as compared with circular members.

While some embodiments of the present invention are herein described, it will be understood that further changes may be in the construction and arrangement without departing from the spirit or scope of the present invention. Therefore, without limiation in this respect, the invention is defined by the following claims.

What we claim is:

1. A bicycle frame comprising a plurality of elements connected together to define a frame assembly having a vertical plane of symmetry, each of said elements having a regular, hexagonal tubular, cross-section with opposite pairs of parallel sides, said elements being respectively oriented in said assembly such that one pair of parallel sides in each elements is parallel to said vertical plane or symmetry.

2. A frame as claimed in claim 1 wherein said elements each have a pair of opposed vertices which are in said vertical plane of symmetry.

3. A frame as claimed in claim 2 wherein said elements are three in number.

4. A frame as claimed in claim 3 wherein said elements have a substantially uniform thickness and are constituted of a single material.

5. A frame as claimed in claim 4 wherein said frame assembly includes a head post, and said elements join with said head post to define a substantially triangular outline.

References Cited

UNITED STATES PATENTS

| D.31,051 | 6/1899 | Blood | D90—8 |
| 672,738 | 4/1901 | Mayerson | 280—274 |

FOREIGN PATENTS

| 867,971 | 12/1941 | France. |
| 115,985 | 2/1945 | Norway. |
| 431,860 | 3/1948 | Italy. |

KENNETH H. BETTS, Primary Examiner